United States Patent [19]
Ohashi et al.

[11] 4,189,541
[45] Feb. 19, 1980

[54] METHOD FOR PRODUCING HEAT RESISTANT AND FLAME RESISTANT POLYISOCYANURATE FOAMS USING LITTLE OR NO ORGANOSILICONE SURFACTANT

[75] Inventors: Takashi Ohashi, Iruma; Toru Okuyama, Sagamihara; Katsuhiko Arai, Higashi-Murayama; Akira Suzuki, Hidaka; Minoru Kojima, Ohme; Yoshiko Taniguchi, Higashi-Murayama; Masako Yoshida, Kodaira; Ryozo Sakata, Higashi-Yamato, all of Japan

[73] Assignee: Bridgestone Tire Company Limited, Tokyo, Japan

[21] Appl. No.: 917,238

[22] Filed: Jun. 20, 1978

[51] Int. Cl.² ............................................. C08G 18/14
[52] U.S. Cl. ..................................... 521/110; 521/902

[58] Field of Search ................................. 521/110, 902

[56] References Cited
U.S. PATENT DOCUMENTS
4,072,636  2/1978  Ashida ................................. 521/110

Primary Examiner—Maurice J. Welsh
Attorney, Agent, or Firm—Sughrue, Rothwell, Mion, Zinn and Macpeak

[57] ABSTRACT

Polyisocyanurate foams having excellent heat resistance and flame resistance are produced by using no common organic silicone surfactant or using less than 0.2% by weight based on an organic polyisocyanate, of said organic silicone surfactant, when producing a polyisocyanurate foam by reacting an organic polyisocyanate, a blowing agent and a catalyst for trimerizing isocyanate and if necessary a surfactant, a modifier and the other additives.

12 Claims, 1 Drawing Figure

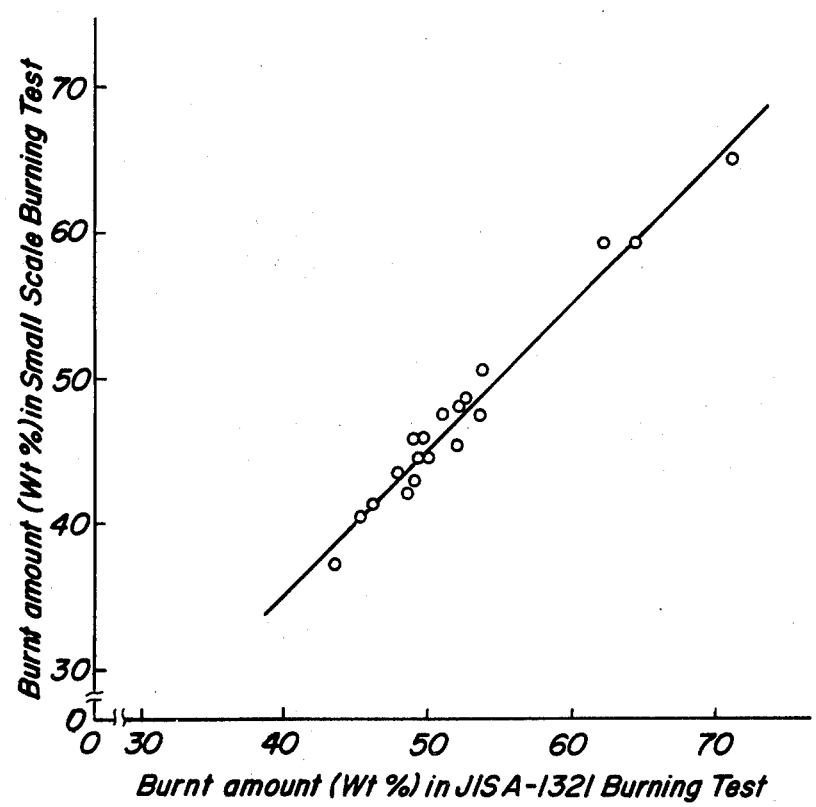

METHOD FOR PRODUCING HEAT RESISTANT AND FLAME RESISTANT POLYISOCYANURATE FOAMS USING LITTLE OR NO ORGANOSILICONE SURFACTANT

BACKGROUND OF THE INVENTION

1. Field of the Invention

The present invention relates to a method for producing polyisocyanurate foams having excellent heat resistance and flame resistance, more particularly to a method for producing polyisocyanurate foams having high heat resistance and flame resistance, which do not cause burst, crack and deformation when exposed to flame.

2. Description of the Prior Art

The method for producing foams having isocyanurate ring structure has been well known and the foundation of the production method has been disclosed in Japanese Pat. No. 503,912, which relates to a composition composed of an organic polyisocyanate, a blowing agent and a catalyst for polymerizing isocyanate group and the polymerization is promoted in the condition of excess of isocyanate group. This polyisocyanurate foam has substantially the same heat insulating performance as the polyurethane foam and is superior in the heat resistance and the flame resistance to the polyurehtane foam and has high usable value as high temperature insulating materials and low temperature insulating materials.

However, the heretofore produced polyisocyanurate foams are very brittle and are poor in physical properties and when exposed to flame, the foam causes burst, crack and deformation.

In order to improve these defects, a variety of processes for producing modified polyisocyanurate foams have been proposed. For example, as the modifying means, use of a polyether, use of a polyester, introduction of polyoxazolidone bond, use of a mixture of a polyol having a molecular weight of moe than 200 and a diolpolyether having a molecular weight of less than 200, use of xylene resin initial condensate, introduction of polycarbodiimido bond, introduction of urethane bond and carbodiimido bond and the like have been known. These modified polyisocyanurate foams can be actually more or less improved in the brittleness and the bursting property, while the fire-proof and the flame resistance decrease and the smoke generation increases.

SUMMARY OF THE INVENTION

The present invention is to provide a method for producing a plyisocyanurate foam having excellent heat resistance and flame resistance by using no organic silicone surfactant or adding an organic silicone surfactant in a ratio of less than 0.2% by weight based on an organic polyisocyanate, in production of the polyisocyanurate foam by reacting an organic polyisocyanate together with a blowing agent and a catalyst for trimerizing isocyanate (referred to as "trimerizing catalyst" hereinafter), and if necessary a surfactant, a modifier and the other additives.

BRIEF DESCRIPTION OF THE DRAWING

The single FIGURE shows a relation between the burnt amount in JIS A-1321 burning test and the burnt amount in the small scale burning test of the polyisocyanurate foams obtained in the present invention.

DETAILED DESCRIPTION OF THE PREFERRED EMBODIMENT

The inventors have earnestly studied in order to solve the drawbacks in the above described prior arts and found that the burst, the crack and the deformation which are caused when the polyisocyanurate foam is exposed to flame, can be effectively prevented by using no organic silicone surfactant which has been heretofore always used in production of polyisocyanurate foams or using less than the particularly defined amount of said surfactant and attained the present invention.

An object of the present invention is to provide a polyisocyanurate foam having good physical properties and excellent heat resistance and flame resistance, which does not cause burst, crack and deformation when exposed to flame.

The present invention consists in a method for producing a polyisocyanurate foam having excellent heat resistance and flame resistance, which does not cause burst, crack and deformation when exposed to flame, by using no organic silicone surfactant or adding an organic silicone surfactant in a ratio of less than 0.2% by weight based on an organic polyisocyanate, in production of the polyisocyanurate foam by reacting an organic polyisocyanate together with a blowing agent and a catalyst for trimerizing isocyanate, and if necessary a surfactant, a modifier and the other additives.

In the production of polyisocyanurate foams, a surfactant is generally compounded in the composition. The function of the surfactant is to control the amount and the quality of the obtained foam and it has been considered that if the surfactant is not used, the foam is collapsed or very large irregular cells are contained. The amount of the surfactant used varies within a broad range depending upon the other components to be used and the physical properties desired for the final product but it has been usual to use at least 0.3% by weight based on the organic polyisocyanate of surfactants.

Accordingly, it has been unexpected result which cannot be supposed from the conventional technics that, as in the present invention, the polyisocyanurate foam having good physical properties and excellent heat resistance and flame resistance which does not cause burst, crack and deformation when exposed to flame can be produced by using the particularly defined amount of 0 to 0.2% by weight of organic silicone surfactants.

In the present invention, the term "organic polyisocyanate" means the organic compounds wherein two or more isocyanate groups are bonded in one molecule and includes aliphatic and aromatic polyisocyanate monomers, the mixtures thereof and the modified products thereof.

As the aliphatic polyisocyanates, mention may be made of hexamethylene diisocyanate, isophorone diisocyanate, dicyclohexylmethane diisocyanate, methylcyclohexane diisocyanate and the like.

As the aromatic polyisocyanates, mention may be made of tolylene diisocyanate (2,4-and/or 2,6-isomer), diphenylmethane diisocyanate, ditolylene diisocyanate, naphthalene diisocyanate (for example, 1,5-naphthalene diisocyanate), triphenylmethane triisocyanate, anisidine diisocyanate, xylylene diisocyanate, tris(isocyanatophenyl) thiophosphate, mixture of a polymethylene polyphenylisocyanate shown by the following general formula (so-called crude MDI or polymeric isocyanate) obtained by reaction of low polycondensate of aniline and formaldehyde with phosgene,

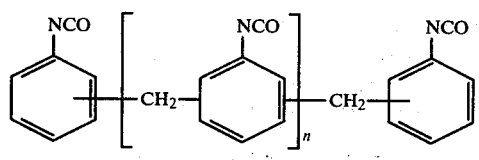

wherein n is 0 or integer of 1 or more.

In addition, partially modified products of the above described various polyisocyanate monomers also can be used in the present invention.

That is, these modified products are those wherein a part of polyisocyanate monomer is modified into polyisocyanates having biuret, allophanate, isocyanurate, carbodiimido, oxazolidone, amido or imido bond and these substances are disclosed on Japanese Patent Application Publication No. 880/73, Japanese Patent No. 743,654, Japanese Patent Application Laid Open No. 197/71, Japanese Patent No. 772,710 and the like.

The modified polyisocyanates can be obtained by reacting polyol with equivalent or excess amount based on polyol, of polyisocyanates. The prepolymers having terminal isocyanate group are also included in the modified organic polyisocyanates. Some examples are polyisocyanate containing urethane bond obtained by reacting trimethylol-propane with tolylene diisocyanate in a molar ratio of 1:3 or more, prepolymer obtained by heating and reacting a mixture of polyether polyol obtained by addition of sucrose and propylene oxide with an excess amount of polymeric isocyanate by a usual process and the like.

The preferred organic polyisocyanates according to the present invention are aromatic polyisocyanates and among them, the polymeric isocyanates shown by the above described formula (I) and the partially modified products thereof are particularly preferable.

As the blowing agents capable of being used in the present invention, all blowing agents to be used for production of urethane foams and isocyanurate foams may be used.

As such blowing agents, mention may be made of (A) inactive solvents having a low boiling point, such as trichloromonofluoromethane, dichlorodifluoromethane, dibromotetrafluoroethane, trichlorotrifluoroethane, methylenechloride, pentane, trichloroethane, benzene, n-hexane and the like, (B) compounds which generate carbon dioxide through reaction with an isocyanate, for example, water, compounds containing water of crystallization, aldoxime, acid amides, compounds capable of being enolated and the like, (C) compounds which are acids decomposed by reaction heat upon formation of foam to generate gas, for example, sodium bicarbonate, ammonium carbonate, azobisisobutyronitrile, azoaminobenzene, dinitrosopentamethylenetetramine and the like.

The preferable blowing agents among the above described various blowing agents are those belonging to the above described (A) in view of the physical properties of foam and easiness of foaming and cost and the most preferable one is trichloromonofluoromethane.

The amount of the blowing agent added is 5 to 50% by weight based on the foam forming composition.

As the catalysts for trimerizing isocyanate to be used in the present invention, use may be made of any compounds capable of trimerizing isocyanate group but it is desirable that the reaction for forming the foam starts at room temperature in the usual case and the foaming is completed in a short time of about 1 to 5 minutes, so that it is desirable to use the catalyst having the effect for promoting the trimerizing reaction. As the trimerizing catalyst, those which cure the polyisocyanate within 10 minutes at 100° C. are preferable.

As the trimerizing catalysts, mention may be made of (A) tertiary amines, such as triethylamine, N,N',N''-tris (dimethylaminopropyl)hexahydrotriazine, 2,4,6-tris (dimethylaminomethyl)phenol, tetramethylethylenediamine, triethylenediamine, Mannich base obtained by reacting phenol or phenol having alkyl substituent and dimethylamine with formaldehyde, cycloamidines and the like, (B) use of tertiary amines together with the cocatalyst thereof, the cocatalyst being ethyl alcohol, mono N-substituted carbamic acid esters, water, aliphatic aldehydes, tertiary imines, benzoyl peroxide, ethylene carbonate, α-diketones (for example, diacetyl), various epoxy compounds and the like, (C) tertiary phosphines, for example, triethylphosphine, (D) alkalimetal salts of imide, for example, potassium phthalimide, sodium succinimide and the like, (E) organic onium compounds, for example, quaternary hydroxides containing nitrogen, phosphorus, sulfur, arsenic or antimony, such as tetraethylammonium hydroxide, benzyltriethylammonium hydroxide, tetraethylphosphonium hydroxide, trimethylphosphonium hydroxide or compounds shown by the following formula

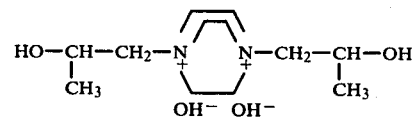

(F) ethyleneimines, for example, N-butylethyleneimine, 2-hydroxyethylethyleneimine and the like, (G) metal salts of carboxylic acids, for example, potassium acetate, potassium 2-ethylcaproate, lead 2-ethylcaproate, sodium benzoate, potassium naphthenate, stannous octoate and the like, (H) basic inorganic compounds, for example, potassium carbonate, potassium hydroxide, barium oxide, potassium hydroxide, sodium hydroxide and the like, (I) alcoholates and phenolates, for example, sodium methoxide, potassium phenolate, sodium trichlorophenolate and the like, (J) Titanium and antimony compounds, for example, tetrabutyltitanate, tri-n-butylantimony oxide and the like, (K) Friedel-Crafts catalysts, for example, $ZnCl_2$, $SnCl_4$, $FeCl_3$, $SbCl_5$, $AlCl_3$, $BF_3$ and the like, (L) alkali metal complexes, for example, complexes of salicylaldehyde, acetylacetone, o-hydroxyacetophenone, quinizarin and the like with alkali metals, alkali metal complexes of tetravalent boron compounds, for example, $[(R^1O)_2BOR^2]^{-M+}$, wherein M is an alkali metal, $R^1$ and $R^2$ are monovalent organic groups.

Among them, it is preferable to use the compound belonging to (A) or (G) alone or to use the compound (A) together with the compound (G). An amount of the trimerizing catalyst used is 1 to 10% by weight based on the organic polyisocyanate.

In the present invention, in addition to the above described components, if necessary a surfactant, a modifier and the other additives may be added.

As the surfactants, use may be made of the surfactants generally used for production of polyurethane foams, for example, condensate of ethylene oxide and hydrophobic base obtained by condensing propylene oxide and propylene glycol, addition product of ethylenediamine and alkylene oxide and polyoxyalkylene esters of sorbitan with long chain fatty acids, such as polyoxyethylenesorbitan monolaurate, polyoxyethylenesorbitan tristearate, polyoxyethylenesorbitan monooleate or polyoxyethylenesorbitan trioleate.

However, it is essential that organosilicon surfactants, such as organopolysiloxane-polyoxyalkylene copolymer, polyalkenylsiloxane having polyoxyalkylene side chain are not used at all or said organic silicone surfactants are used in an amount of less than 0.2% by weight based on the organic polyisocyanate when using such a surfactant.

When the organic silicone surfactants are compounded in an amount of more than 0.2% by weight, the obtained foam causes crack and deformation when exposed to flame.

Accordingly, in the preferred embodiment of the present invention, the aimed foam can be produced without using the surfactant.

As mentioned above, the present invention also relates to a method for producing modified polyisocyanurate foams in which a modifier is added.

As the modifiers to be used in the present invention, polyether polyol, polyester polyol, polyepoxide, polyesteramide, polyamine, polycarboxylic acid, liquid diene polymer having hydroxyl terminal group, fats and oils having hydroxyl group, phenol resin initial condensates (novolak and resol) and the like have been known. Among them, polyether polyol or polyester polyol is preferable.

In the above described modification, the modifier is used in such a proportion that the molar ratio of isocyanate to the modifier is more than 3, preferably 5 to 20.

The method for producing polyisocyanurate foams by using polyether as a modifier has been disclosed in Japanese Patent Application Publication No. 42,386/71.

The method for producing polyisocyanurate foams by using polyester as a modifier has been disclosed in Japanese Pat. No. 727,539.

The method for producing polyisocyanurate foams by using polycarboxylic acids or the anhydrides thereof as a modifier has been disclosed in Japanese Pat. No. 727,539.

As the other additives, inorganic hollow particles, granular refractories, fibrous materials, inorganic fillers are used and these substances are used in order to improve the physical properties, for example, hardness of the foam.

The embodiment of the inorganic fillers includes mica powders, finely divided clay powders, asbestos, calcium carbonate, silica gel, aluminium hydroxide, calcium hydroxide, magnesium hydroxide, calcium carbonate, gypsum, sodium silicate and the like. The above described additives are conveniently used within the range of 0 to 180 parts by weight based on 100 parts by weight of the foam forming composition.

The production of the polyisocyanurate foam is usually carried out by the following processes.

(a) To an organic polyisocyanate are added a trimerizing catalyst, a blowing agent and a surfactant and the resulting mixture is stirred to foam the mixture.

(b) A method for producing a modified polyisocyanurate foam. In the above described similar foaming method, a modifier has been previously reacted with a polymethylene polyphenyl isocyanate to form a modified polyisocyanate and then said modified polyisocyanate is foamed (prepolymer process).

Alternatively, a polymethylene polyphenyl isocyanate, a modifier, a trimerizing catalyst, a blowing agent and a surfactant are concurrently mixed to effect foaming (one shot process).

(c) A polyol-containing isocyanurate ring, a polyisocyanate, a blowing agent, a surfactant and a urethane foaming catalyst are used to effect foaming.

In the present invention, any of the above described processes (a), (b) and (c) may be used.

According to the present invention, the polyisocyanurate foams having excellent general physical properties and excellent heat resistance and flame resistance can be obtained.

In particular, the polyisocyanurate foams obtained according to the present invention do not cause burst, crack and deformation when contacting with flame and are excellent in the heat resistance and the flame resistance and pass JIS A-1321, fire-proof Class 2.

Accordingly, the polyisocyanurate foams obtained by the present invention are useful as construction materials to be used for general houses or buildings and further are used as various laminate boards combined with surface materials, such as aluminum foil, asbestos paper, asbestos plate and the like.

The following examples are given for the purpose of illustration of this invention and are not intended as limitations thereof. In the examples, "parts" and "%" mean parts by weight and % by weight, respectively.

The inflammability and smoke generating property of the resulting foam, and the crack and deformation of the foam when the foam was exposed to flame, were evaluated according to the following methods.

1. JIS A-1321 burning test: (Testing methods for incombustibility of internal finish material and procedure of buildings.)

A test piece having a dimension of 22×22×2.5 cm was heated for a given period of time in a furnace by the combination use of an auxiliary heating source of propane gas and a main heating source of electric heater, and the crack and deformation of the test piece were observed and the after-flaming which remained after the heating, and the smoke generation coefficient were measured. Further, the flue gas temperature curve was measured, and the area encompassed by the flue gas temperature curve and the standard time-temperature curve obtained by the same of perlite plate was measured (this area is abbreviated as "flue gas temperature-time curve area" hereinafter). The flame resistance of the test piece was judged by the standard value described in the following Table 1. Further, the weights of the test piece before and after burning were measured, and the burnt amount was calculated.

Table 1

| Item | Standard value | |
|---|---|---|
| Flue glass temperature-time curve area Tdθ (°C. × min) | not more than 350 | not more than 100 |
| Smoke generation coefficient $C_A$ | not more than 120 | not more than 60 |
| After-flame | not longer than 30 seconds | not longer than 30 seconds |
| Crack and deformation | none | none |
| Judgement | fire-proof Class 3 | fire-proof Class 2 |

2. Small scale burning test:

A test piece having a dimension of 8×8×1 cm was fixed vertically by means of a metal frame and exposed to a propane torch flame for 90 seconds in such a manner that the flame vertically contacts with center portion of the surface of the test piece from a position 7 cm apart from the test piece while blowing air at a rate of 5 l/min by means of a glass blower's burner. Generation of smoke was observed from the beginning of contact of the flame with the test piece surface, and the smoke generation time and the amount of smoke generated were recorded (the amount of generated smoke was observed by eye). After completion of the above test, the crack and deformation of the test piece were observed.

the single Figure shows a relation between JIS A-1321 burning test and the above described small scale burning test with respect to the burnt amount shown by % by weight. It can be seen from the relation that there is a corelation between the burnt amounts in both tests.

EXAMPLES 1 TO 5 AND COMPARATIVE EXAMPLES 1 to 3

Crude diphenylmethane diisocyanate having an isocyanate equivalent of 133, sold by Japan Polyurethane Co. under the trademark Coronate 47, was used as an organic polyisocyanate. N,N',N''-Tris(dimethylaminopropyl)-symhexahydrotriazine sold by Abbott Laboratories Co. under the trademark Polycat 41, 2,4,6-tris(-dimethylaminomethyl)phenol sold by Rohm & Haas Co. under the trademark DMP-30 and a diethylene glycol or dipropylene glycol solution containing 33% of potassium acetate (hereinafter, abbreviated as AcOK/DEG or AcOK/DPG) were used as trimerization catalysts. Trichloromonofluoromethane sold under the trademark F-11 was used as a blowing agent. These components were reacted in the compounding recipe shown in the following Table 2 to produce a polyisocyanurate foam. In the production of the foam, components other than the organic polyisocyanate were fully mixed in a polyethylene beaker. Then, the organic polyisocyanate was added to the mixture, and the resulting mixture was immediately stirred at high speed for about 8 seconds, and then poured in a wooden mold and foamed therein. The compounding recipe, the foaming behavior and the result of the small scale burning test of the resulting polyisocyanurate foam are shown in Table 2. For comparison, an organic silicone surfactant was further added as a surfactant to the above described compounding recipe to produce a polyisocyanurate foam. The results of the above described test of the comparative foams are also shown in Table 2. Further, sample foams of Examples 2 and 3 and Comparative Example 1 were subjected to JIS A-1321 burning test. The foams of Examples 2 and 3 neither cracked nor deformed, but the form of Comparative Example 1 was burst. The flue gas temperature-time curve areas Tdθ(°C×min) of the former foams were 38 and 29, but that of the latter foam was 73. The smoke generation coefficients $C_A$ of the former foams were 21 and 8, but that of the latter was 52. That is, the foams of Examples 2 and 3 are fire-proof Class 2 foams but the foam of Comparative Example 1 is a reject.

Table 2(a)

| | Comparative Example 1 | Example 1 | Example 2 | Comparative Example 2 | Example 3 | Example 4 | Example 5 | Comparative Example 3 |
|---|---|---|---|---|---|---|---|---|
| Compounding recipe (parts) | | | | | | | | |
| Crude diphenylmethane diisocyanate [a] | 100 | 100 | 100 | 100 | 100 | 100 | 100 | 100 |
| Catalyst (I) [b] | 3.0 | 3.0 | — | — | — | — | — | — |
| Catalyst (II) [c] | — | — | 3.5 | — | — | — | — | — |
| Catalyst (III) [d] | 2.0 | 2.0 | 2.0 | 2.0 | 3.0 | 3.0 | 3.0 | 3.0 |
| Catalyst (IV) [e] | — | — | — | 3.0 | 3.0 | 3.0 | 3.0 | 3.0 |
| Blowing agent [f] | 20 | 20 | 20 | 20 | 20 | 20 | 20 | 20 |
| Organic silicone surfactant (I) [g] | 1.0 | — | — | 1.0 | — | 0.1 | 0.2 | 0.3 |
| NCO/OH ratio | 20/1 | 20/1 | 20/1 | ∞ | ∞ | ∞ | ∞ | ∞ |
| Foaming behavior (sec) | | | | | | | | |
| Cream time | 18 | 35 | 28 | 28 | 28 | 26 | 25 | 25 |
| Rise time | 60 | 105 | 75 | 90 | 80 | 81 | 88 | 88 |
| Foam density (g/cm³) | 0.0342 | 0.0361 | 0.0334 | 0.0336 | 0.0358 | 0.0341 | 0.0346 | 0.0338 |

Table 2(b)

| | Comparative Example 1 | Example 1 | Example 2 | Comparative Example 2 | Example 3 | Example 4 | Example 5 | Comparative Example 3 |
|---|---|---|---|---|---|---|---|---|
| Small scale burning test | | | | | | | | |
| Crack and deformation | burst | none | none | burst | none | none | none | " |
| Smoke generation time (sec) | 4 | 11 | 7 | 4 | 7 | 13 | 15 | 19 |
| Amount of generated | | | | | | | | |

Table 2(b)-continued

|  | Comparative Example 1 | Example 1 | Example 2 | Comparative Example 2 | Example 3 | Example 4 | Example 5 | Comparative Example 3 |
|---|---|---|---|---|---|---|---|---|
| smoke (eye observation) | small | small | small | small | small | small | small | small |

Note:
[a] Sold by Japan Polyurethane Co. under the trademark Coronate 47.
[b] Diethylene glycol solution containing 33% of potassium acetate.
[c] Dipropylene glycol solution containing 33% of potassium acetate.
[d] N,N',N''-tris(dimethylaminopropyl)-sym-hexahydrotriazine sold by Abbott Laboratories Co. under the trademark Polycat 41.
[e] 2,4,6-Tris (dimethylaminomethyl)phenol sold by Rohm & Haas Co. under the trademark DMP-30.
[f] Trichloromonofluoromethane sold under the trademark F-11.
[g] Polyalkylsiloxane-polyoxyalkylene copolymer sold by Toray Silicone Co. under the trademark SH-193.

It can be seen from Table 2 that, when an organic silicone surfactant is not used at all or is used in a very small amount of not more than 0.2% by weight based on the weight of an organic polyisocyanate, the resulting polyisocyanurate foam has improved heat resistance and flame resistance, and does not crack nor deform in the case where the foam is contacted with the fire, and satisfies the fire-proof Class 2 standard defined in JIS A-1321.

EXAMPLES 6 TO 11 AND COMPARATIVE EXAMPLES 4 TO 9

Urethane-modified polyisocyanurate foam was produced in the same manner as described in Example 1. That is, a modifier of diol-base polyether polyol or triol-base polyether polyol, catalysts of N,N',N''-tris(-dimethylaminopropyl)-sym-hexahydrotriazine and AcOK/DEG and a blowing agent of trichloromonofluoromethane were fully mixed, and then added with crude diphenylmethane diisocyanate. The resulting mixture was immediately stirred at high speed for about 8 seconds to be foamed. Table 3 shows the compounding recipe, the foaming behavior and the test results of the inflammability, smoke generating property, crack and deformation of the resulting urethane modified polyisocyanurate foam. For comparison, an organic silicone surfactant, as a surfactant, was further added to the compounding recipe of the above described foam to produce an urethane modified polyisocyanurate foam. The compounding recipe, the foaming behavior and the test results of the comparative foam are also shown in Table 3.

Table 3(a)

|  | Ex. 6 | Comp. Ex. 4 | Ex. 7 | Comp. Ex. 5 | Ex. 8 | Comp. Ex. 6 | Ex. 9 | Comp. Ex. 7 | Ex. 10 | Comp. Ex. 8 | Ex. 11 | Comp. Ex. 9 |
|---|---|---|---|---|---|---|---|---|---|---|---|---|
| Compounding recipe (parts) | | | | | | | | | | | | |
| Crude diphenylmethane diisocyanate [a] | 100 | 100 | 100 | 100 | 100 | 100 | 100 | 100 | 100 | 100 | 100 | 100 |
| Polyol (I) [h] | 11.8 | 11.8 | 7.6 | 7.6 | — | — | — | — | — | — | — | — |
| Polyol (II) [i] | — | — | — | — | 15.0 | 15.0 | 8.7 | 8.7 | — | — | — | — |
| Polyol (III) [j] | — | — | — | — | — | — | — | — | 13.0 | 13.0 | 8.3 | 8.3 |
| Catalyst (I) [b] | 2.4 | 2.4 | 2.4 | 2.4 | 2.4 | 2.4 | 2.4 | 2.4 | 2.4 | 2.4 | 2.4 | 2.4 |
| Catalyst (III) [d] | 0.5 | 0.5 | 0.5 | 0.5 | 0.5 | 0.5 | 0.5 | 0.5 | 0.5 | 0.5 | 0.5 | 0.5 |
| Blowing agent [f] | 20 | 20 | 20 | 20 | 23 | 23 | 22 | 22 | 24 | 24 | 23 | 23 |
| Organic silicone surfactant [g] | — | 1.0 | — | 1.0 | — | 1.0 | — | 1.0 | — | 1.0 | — | 1.0 |
| NCO/OH ratio | 5/1 | 5/1 | 7/1 | 7/1 | 7/1 | 7/1 | 10/1 | 10/1 | 5/1 | 5/1 | 7/1 | 7/1 |
| Foaming behavior (sec) | | | | | | | | | | | | |
| Cream time | 11 | 17 | 12 | 11 | 8 | 7 | 8 | 8 | 14 | 15 | 14 | 11 |
| Rise time | 48 | 68 | 52 | 67 | 45 | 55 | 48 | 60 | 60 | 64 | 58 | 87 |
| Foam density (g/cm$^3$) | 0.0286 | 0.0270 | 0.0280 | 0.0281 | 0.0278 | 0.0304 | 0.0289 | 0.0290 | 0.0266 | 0.0286 | 0.0283 | 0.0283 |

Table 3(b)

|  | Ex. 6 | Comp. Ex. 4 | Ex. 7 | Comp. Ex. 5 | Ex. 8 | Comp. Ex. 6 | Ex. 9 | Comp. Ex. 7 | Ex. 10 | Comp. Ex. 8 | Ex. 11 | Comp. Ex. 9 |
|---|---|---|---|---|---|---|---|---|---|---|---|---|
| Small scale burning test | | | | | | | | | | | | |
| Crack and deformation | none | 0.0270 | none | 0.0281 | none | 0.0304 | none | 0.0290 | none | 0.0286 | none | 0.0283 |
| Smoke generation time (sec) | 10 | 12 | 10 | 11 | 11 | 11 | 7 | 9 | 6 | 7 | 3 | 4 |
| Amount of generated smoke (eye observation) | small | medium | small | small | medium | medium | small | small | small | small | small | small |
| JIS A-1321 burning test | | | | | | | | | | | | |
| Crack and deformation | none | burst | none | " | none | burst | none | burst | none | " | none | " |
| Flue gas temperature-time curve area Tdθ (°C. × min) | 154 | 180 | 120 | 141 | 108 | 206 | 134 | 195 | 64 | 104 | 53 | 165 |
| Smoke generation coefficient $C_A$ | 29 | 38 | 35 | 36 | 22 | 45 | 21 | 40 | 28 | 45 | 27 | 63 |
| After-flaming (sec) | 0 | 0 | 0 | 52 | 0 | 73 | 0 | 85 | 20 | 0 | 0 | 0 |
| Judgement | fireproof | reject | fireproof | reject | fireproof | reject | fireproof | reject | fireproof | reject | fireproof | reject |

Table 3(b)-continued

| | Ex. 6 | Comp. Ex. 4 | Ex. 7 | Comp. Ex. 5 | Ex. 8 | Comp. Ex. 6 | Ex. 9 | Comp. Ex. 7 | Ex. 10 | Comp. Ex. 8 | Ex. 11 | Comp. Ex. 9 |
|---|---|---|---|---|---|---|---|---|---|---|---|---|
| | class 3 | | class 3 | | class 3 | | class 3 | | class 2 | | class 2 | |

Note:
*a, b, d, f* and *g* refer to Tabel 2.
*h* Polyoxypropylene glycol having a hydroxyl value of 561 sold by Sanyo Kasei Co.
*i* Polyoxypropylene glycol having a hydroxyl value of 281 sold by Sanyo Kasei Co.
*j* Polyoxypropylene triol having a hydroxyl value of 510 sold by Asahi Denka Co.

It can be seen from Table 3 that all the foams obtained by the use of organic silicone surfactant crack and deform and are rejected in JIS A-1321 burning test, but all the foams according to the present invention neither crack nor deform and satisfy the fire-proof Class 2 or 3 standard defined in JIS A-1321 burning test.

EXAMPLES 12 TO 36 AND COMPARATIVE EXAMPLES 10 TO 26

Urethane-modified polyisocyanurate foams were produced by adding various polyols in the same manner as described in Example 1. Tables 4 to 7 show the compounding recipe, the foaming behavior and the test results of inflammability, smoke generating property, crack and deformation of the resulting foam. For comparison, an organic silicone surfactant, as a surfactant, was further added to the compound recipe for the above described foam to produce comparative urethane-modified polyisocyanurate foams. The compounding recipe, the foaming behavior and the test results of the comparative foams are also shown in Tables 4 to 7. It can be seen from Tables 4 to 7 that the urethane-modified polyisocyanurate foam obtained without the use of organic silicone surfactant or obtained by the use of a small amount of not more than 0.2% by weight based on the amount of organic polyisocyanate neither cracks nor deforms in the case where the foam is contacted with flame, and is excellent in the heat resistance and flame resistance.

Table 4(a)

| | Example 12 | Comparative Example 10 | Example 13 | Example 14 | Comparative Example 11 | Example 15 | Comparative Example 12 | Example 16 | Comparative Example 13 |
|---|---|---|---|---|---|---|---|---|---|
| Compounding recipe (parts) | | | | | | | | | |
| Crude diphenylmethane diisocyanate *a* | 100 | 100 | 100 | 100 | 100 | 100 | 100 | 100 | 100 |
| Polyol (I) *h* | 7.9 | 7.9 | 4.5 | 5.0 | 5.0 | 7.9 | 7.9 | 5.0 | 5.0 |
| Polyol (IV) *k* | 4.9 | 4.9 | 2.8 | — | — | — | — | — | — |
| Polyol (V) *l* | — | — | — | 7.2 | 7.2 | — | — | — | — |
| Polyol (VI) *m* | — | — | — | — | — | 1.8 | 1.8 | 1.1 | 1.1 |
| Organic silicone surfactant (I) *g* | — | 1.0 | — | — | 1.0 | — | 1.0 | — | 1.0 |
| Organic silicone surfactant (II) *n* | 0.1 | — | — | — | — | — | — | — | — |
| NCO/OH ratio | 5/1 | 5/1 | 7/1 | 7/1 | 7/1 | 5/1 | 5/1 | 7/1 | 7/1 |
| Foaming behavior (sec) | | | | | | | | | |
| Cream time | 16 | 24 | 13 | 16 | 11 | 14 | 14 | 14 | 12 |
| Rise time | 48 | 105 | 52 | 55 | 50 | 45 | 60 | 45 | 65 |
| Foam density (g/cm$^3$) | 0.0308 | 0.0288 | 0.0286 | 0.0299 | 0.0318 | 0.0291 | 0.0289 | 0.0287 | 0.0291 |
| Small scale burning test | | | | | | | | | |
| Crack and deformation | none | | none | none | | none | | none | |
| Smoke generation time (sec) | 10 | | 3 | 10 | | 10 | | 11 | |
| Amount of generated smoke (eye observation) | small | | small | small | | small | | small | |

Table 4(b)

| | Example 12 | Comparative Example 10 | Example 13 | Example 14 | Comparative Example 11 | Example 15 | Comparative Example 12 | Example 16 | Comparative Example 13 |
|---|---|---|---|---|---|---|---|---|---|
| JIS A-1321 burning test | | | | | | | | | |
| Crack and deformation | none | burst | none | none | burst | none | 0.0289 | none | burst |
| Flue gas temperature-time curve area Tdθ (°C. × min) | 125 | 181 | 88 | 240 | 111 | 156 | 165 | 60 | 194 |
| Smoke generation coefficient C$_A$ | 56 | 44 | 50 | 54 | 64 | 60 | 39 | 55 | 45 |
| After-flaming (sec) | 0 | 45 | 0 | 27 | 0 | 25 | 0 | 16 | 28 |
| Judgement | fire-proof | | fire-proof | fire-proof | | fire-proof | | fire-proof | |

Table 4(b)-continued

|  | Example 12 | Comparative Example 10 | Example 13 | Example 14 | Comparative Example 11 | Example 15 | Comparative Example 12 | Example 16 | Comparative Example 13 |
|---|---|---|---|---|---|---|---|---|---|
|  | class 3 | reject | class 2 | class 3 | reject | class 3 | reject | class 2 | reject |

Note:
Common condition: Catalyst (I), catalyst (II) and blowing agent (refer to Table 2) are used in amounts of 2.4 parts, 0.5 part and 20 parts, respectively.

k Sugar-base polyoxypropylene octol having a hydroxyl value of 448 sold by Mitsui Nisso Co. under the trademark Su-450M.
l Bisphenol A-base polyoxypropylene glycol having a hydroxyl value of 195 sold by Asahi Denka Co. under the trademark BPX-33.
m 3-Methyl-1,3,5-pentane triol having a hydroxyl value of 1,272 sold by Kuraray Co. under the trademark Petriol.
n Polyalkylsiloxane-polyoxyalkylene copolymer sold by Toray Silicone Co. under the trademark BY-10-504.
a and g refer to Table 2.
h refer to Table 3.

Table 5(a)-1

|  | Example 17 | Comparative Example 14 | Example 18 | Comparative Example 15 | Example 19 | Comparative Example 16 | Example 20 |
|---|---|---|---|---|---|---|---|
| Compounding recipe (parts) | | | | | | | |
| Crude diphenylmethane diisocyanate a | 100 | 100 | 100 | 100 | 100 | 100 | 100 |
| Polyol (I) i | 5.0 | 5.0 | 10.1 | 15.0 | 15.7 | 15.7 | 10.1 |
| Polyol (III) j | — | — | — | — | — | — | — |
| Polyol (IV) k | 6.3 | 6.3 | 3.2 | 3.2 | — | — | — |
| Polyol (VII) o | — | — | — | — | 4.2 | 4.2 | 2.7 |
| Organic silicone surfactant (I) g | — | 1.0 | — | 1.0 | — | 1.0 | — |
| NCO/OH ratio | 7/1 | 7/1 | 7/1 | 7/1 | 5/1 | 5/1 | 7/1 |
| Foaming behavior (sec) | | | | | | | |
| Cream time | 13 | 10 | 8 |  | 8 | 6 | 6 |
| Rise time | 41 | 40 | 25 |  | 40 | 20 | 30 |
| Foam density (g/cm³) | 0.0321 | 0.0322 | 0.0318 | 0.0319 | 0.0319 | 0.0326 | 0.0304 |
| Small scale burning test | | | | | | | |
| Crack and deformation | none |  | none |  | none |  | none |
| Smoke generation time (sec) | 10 |  | 11 |  | 10 |  | 10 |
| Amount of generated smoke (eye observation) | small |  | small |  | small |  | small |

Table 5(a)-2

|  | Comparative Example 17 | Example 21 | Comparative Example 18 | Example 22 | Example 23 | Comparative Example 19 | Example 24 |
|---|---|---|---|---|---|---|---|
| Compounding recipe (parts) | | | | | | | |
| Crude diphenylmethane diisocyanate a | 100 | 100 | 100 | 100 | 100 | 100 | 100 |
| Polyol (I) i | 10.1 | 7.9 | 7.9 | 5.0 | 15.7 | 15.7 | 10.1 |
| Polyol (III) j | — | 8.7 | 8.7 | 5.5 | 4.3 | 4.3 | 2.8 |
| Polyol (IV) k | — | — | — | — | — | — | — |
| Polyol (VII) o | 2.7 | — | — | — | — | — | — |
| Organic silicone surfactant (I) g | 1.0 | — | 1.0 | — | — | 1.0 | — |
| NCO/OH ratio | 7/1 | 5/1 | 5/1 | 7/1 | 5/1 | 5/1 | 7/1 |
| Foaming behavior (sec) | | | | | | | |
| Cream time | 6 | 11 | 13 | 11 | 10 | 11 | 9 |
| Rise time | 26 | 32 | 58 | 35 | 45 | 52 | 30 |
| Foam density (g/cm³) | 0.0322 | 0.0332 | 0.0305 | 0.0285 | 0.0232 | 0.0316 | 0.0319 |
| Small scale burning test | | | | | | | |
| Crack and deformation |  | none |  | none | none |  | none |
| Smoke generation time (sec) |  | 14 |  | 16 | 15 |  | 13 |
| Amount of generated smoke (eye observation) |  | medium |  | medium | small |  | small |

Table 5(b)-1

|  | Example 17 | Comparative Example 14 | Example 18 | Comparative Example 15 | Example 19 | Comparative Example 16 | Example 20 |
|---|---|---|---|---|---|---|---|
| JIS A-1321 burning test | | | | | | | |
| Crack and deformation | none | do | none | do | none | burst | none |
| Flue gas temperature-time curve area Tdθ (°C. × min) | 75 | 151 | 116 | 240 | 246 | 240 | 191 |
| Smoke generation coefficient $C_A$ | 63 | 46 | 49 | 44 | 54 | 41 | 49 |
| After-flaming (sec) | 10 | 0 | 23 | 13 | 0 | 0 | 25 |
| Judgement | fire-proof |  | fire-proof |  | fire-proof |  | fire-proof |

Table 5(b)-1-continued

| | Example 17 | Comparative Example 14 | Example 18 | Comparative Example 15 | Example 19 | Comparative Example 16 | Example 20 |
|---|---|---|---|---|---|---|---|
| | class 3 | reject | class 3 | reject | class 3 | reject | class 3 |

Note:
Common condition: Catalyst (I), catalyst (III) and blowing agent (refer to Table 2) are used in amounts of 2.4 parts, 0.5 part and 20 parts, respectively. However, in Example 23, 24 parts of blowing agent is used.
o Glycerine-base polyoxyethylene triol having a hydroxyl value of 510 sold by Asahi Denka Co.
a and g refer to Table 2.
i and j refer to Table 3.
k refer to Table 4.

Table 5(b)-2

| | Comparative Example 17 | Example 21 | Comparative Example 18 | Example 22 | Example 23 | Comparative Example 19 | Example 24 |
|---|---|---|---|---|---|---|---|
| JIS A-1321 burning test | | | | | | | |
| Crack and deformation | burst | none | burst | none | none | " | none |
| Flue gas temperature-time curve area $Td\theta$ (°C. × min) | 163 | 125 | 220 | 113 | 65 | 246 | 75 |
| Smoke generation coefficient $C_A$ | 65 | 64 | 46 | 64 | 23 | 45 | 49 |
| After-flaming (sec) | 40 | 0 | 0 | 0 | 0 | 65 | 0 |
| Judgement | reject | fire-proof class 3 | reject | fire-proof class 3 | fire-proof class 2 | reject | fire-proof class 2 |

Table 6(a)

| | Example 25 | Comparative Example 20 | Example 26 | Comparative Example 21 | Example 27 | Example 28 | Comparative Example 22 | Example 29 | Comparative Example 23 |
|---|---|---|---|---|---|---|---|---|---|
| Compounding recipe (parts) | | | | | | | | | |
| Crude diphenylmethane diisocyanate a | 100 | 100 | 100 | 100 | 100 | 100 | 100 | 100 | 100 |
| Polyol (III) j | 8.7 | 8.7 | 8.6 | 8.6 | 5.6 | 5.6 | 5.6 | — | — |
| Polyol (V) l | 11.2 | 11.2 | — | — | — | — | — | 7.2 | 7.2 |
| Polyol (VII) o | — | — | 4.2 | 4.2 | 2.7 | 2.7 | 2.7 | 5.4 | 5.4 |
| Organic silicone surfactant (I) g | — | 1.0 | — | 1.0 | — | 0.1 | 1.0 | — | 1.0 |
| NCO/OH ratio | 5/1 | 5/1 | 5/1 | 5/1 | 7/1 | 7/1 | 7/1 | 7/1 | 7/1 |
| Foaming behavior (sec) | | | | | | | | | |
| Cream time | 13 | 11 | 10 | 9 | 10 | 8 | 10 | 9 | 11 |
| Rise time | 60 | 60 | 26 | 40 | 27 | 47 | 43 | 43 | 46 |
| Foam density (g/cm³) | 0.0337 | 0.0341 | 0.0326 | 0.0348 | 0.0311 | 0.0304 | 0.0318 | 0.0321 | 0.0326 |
| Small scale burning test | | | | | | | | | |
| Crack and deformation | | do | none | do | none | | burst | none | do |
| Smoke generation time (sec) | | 10 | 13 | 15 | 11 | | 10 | 13 | 12 |
| Amount of generated smoke (eyeobservation) | | small | small | medium | small | | small | small | small |
| Burnt amount (weight %) | | 42.7 | 42.1 | 43.0 | 41.1 | | 40.6 | 41.6 | 43.1 |

Table 6(b)

| | Example 25 | Comparative Example 20 | Example 26 | Comparative Example 21 | Example 27 | Example 28 | Comparative Example 22 | Example 29 | Comparative Example 23 |
|---|---|---|---|---|---|---|---|---|---|
| JIS A-1321 burning test | | | | | | | | | |
| Crack and deformation | none | do | none | | none | none | | none | |
| Flue gas temperature-time curve area $Td\theta$ (°C. × min) | 161 | 159 | 127 | | 58 | 95 | | 65 | |
| Smoke generation coefficient $C_A$ | 61 | 75 | 59 | | 51 | 42 | | 62 | |
| After-flaming (sec) | 0 | 70 | 26 | | 0 | 0 | | 15 | |
| Burnt amount (weight %) | 49.5 | 50.1 | 50.4 | | 46.1 | 47.6 | | 50.4 | |
| Judgement | fire-proof class 3 | reject | fire-proof class 2 | | fire-proof class 2 | fire-proof class 2 | | fire-proof class 3 | |

Note:
Common condition: Catalyst (I), catalyst (III) and blowing agent (refer to Table 2) are used in amounts of 2.4 parts, 0.5 part and 20 parts, respectively.
a and g refer to Table 2.
j refer to Table 3.
l refer to Table 4.
o refer to Table 5.

Table 7(a)

| | Ex. 30 | Comp. Ex. 24 | Ex. 31 | Ex. 32 | Ex. 33 | Comp. Ex. 25 | Ex. 34 | Ex. 35 | Ex. 36 | Comp. Ex. 26 |
|---|---|---|---|---|---|---|---|---|---|---|
| Compounding recipe (parts) | | | | | | | | | | |
| Crude diphenylmethane diisocyanate a | 100 | 100 | 100 | 100 | 100 | 100 | 100 | 100 | 100 | 100 |
| Polyol (II) | 7.9 | 7.9 | 7.9 | 5.0 | 15.7 | 15.7 | 10.1 | 7.9 | 7.9 | 7.9 |
| Polyol (VI) m | 3.6 | 3.6 | 3.6 | 2.3 | 1.7 | 1.7 | 1.1 | 3.6 | 3.6 | 3.6 |
| Organic silicone surfactant g | — | 1.0 | — | 1.0 | — | 1.0 | — | 0.1 | 0.2 | 0.3 |
| NCO/OH ratio | 5/1 | 5/1 | 5/1 | 7/1 | 5/1 | 5/1 | 7/1 | 5/1 | 5/1 | 5/1 |
| Foaming behavior (sec) | | | | | | | | | | |
| Cream time | 10 | 10 | 9 | 11 | 9 | 7 | 10 | 12 | 11 | 12 |
| Rise time | 37 | 38 | 40 | 40 | 28 | 53 | 32 | 50 | 48 | 52 |
| Foam density (g/cm³) | 0.0304 | 0.0299 | 0.0276 | 0.0285 | 0.0363 | 0.0320 | 0.0316 | 0.0306 | 0.0295 | 0.0295 |
| Small scale burning test | | | | | | | | | | |
| Crack and deformation | none | do | none | none | none | burst | none | none | none | do |
| Smoke generation time (sec) | 9 | 8 | 9 | | 13 | 9 | 12 | 14 | 15 | 14 |
| Amount of generated smoke (eye observation) | small | small | small | | small | small | small | medium | medium | medium |

Table 7(b)

| | Ex. 30 | Comp. Ex. 24 | Ex. 31 | Ex. 32 | Ex. 33 | Comp. Ex. 25 | Ex. 34 | Ex. 35 | Ex. 36 | Comp. Ex. 26 |
|---|---|---|---|---|---|---|---|---|---|---|
| JIS A-1321 burning test | | | | | | | | | | |
| Crack and deformation | none | do | none | none | none | do | none | none | none | do |
| Flue gas temperature-time curve area Tdθ (°C. × min) | 44 | 49 | 65 | 75 | 248 | 96 | 140 | 98 | 173 | 116 |
| Smoke generation coefficient $C_A$ | 46 | 47 | 19 | 40 | 65 | 45 | 48 | 48 | 57 | 48 |
| After-flaming (sec) | 0 | 0 | 25 | 5 | 0 | 28 | 0 | 0 | 0 | 0 |
| Judgement | fire-proof class 2 | reject | fire-proof class 2 | fire-proof class 2 | fire-proof class 3 | reject | fire-proof class 3 | fire-proof class 2 | fire-proof class 3 | reject |

Note:
Common condition: Catalyst (I), catalyst (III) and blowing agent (refer to Table 2) are used in amount of 2.4 parts, 0.5 part and 20 parts, respectively.
a and g refer to Table 2.
i refer to Table 3.
m refer to Table 4.

What is claimed is:

1. In a method for producing a polyisocyanurate foam by reacting an organic polyisocyanate together with a blowing agent and a catalyst for trimerizing isocyanate, the improvement which comprises using no organosilicone surfactant or adding an organosilicone surfactant in a ratio of less than 0.2% by weight based on the organic isocyanate to form a polyisocyanurate foam having excellent heat resistance and flame resistance, wherein said organosilicone surfactant is selected from the group consisting of organosiloxanepolyoxyalkylene copolymers and polyalkenylsiloxanes having a polyoxyalkylene side chain.

2. The method as claimed in claim 1, wherein the organic polyisocyanate is an aromatic polyisocyanate.

3. The method as claimed in claim 2, wherein the organic polyisocyanate is mixture of polymethylene polyphenylisocyanates having the following formula

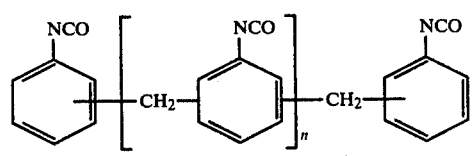

(I)

wherein n is 0 or an integer of 1 or more.

4. The method as claimed in claim 1, wherein the blowing agent is an inactive solvent having a low boiling point.

5. The method as claimed in claim 4, wherein the blowing agent is trichloromonofluoromethane.

6. The method as claimed in claim 1, wherein the trimerizing catalyst is selected from the group consisting of a tertiary amine, a metal salt of carbonic acid or a mixture thereof.

7. The method as claimed in claim 1, wherein the trimerizing catalyst is used in an amount of 1 to 10% by weight based on the organic polyisocyanate.

8. The method as claimed in claim 1, wherein no organosilicon surfactant is used.

9. The method as claimed in claim 1, wherein the modifier is polyether polyol, polyester polyol, polyepoxide, polyesteramide, polyamine, polycarboxylic acid, liquid diene polymer having hydroxyl terminal group, fats and oils having hydroxyl group or phenol resin initial condensate selected from the group consisting of novolak and resol initial condensates.

10. The method as claimed in claim 9, wherein the modifier is polyether polyol or polyester polyol.

11. The method as claimed in claim 1, wherein an additive selected from the group consisting of inorganic hollow particles, granular refractories, fibrous substance and an inorganic filler is added to the organic polyisocyanate, blowing agent, catalyst and organosilicone surfactant.

12. The method as claimed in claim 1, wherein the surfactant(s) present, if any, consists essentially of the organosilicone surfactant.